United States Patent Office 3,333,159
Patented July 25, 1967

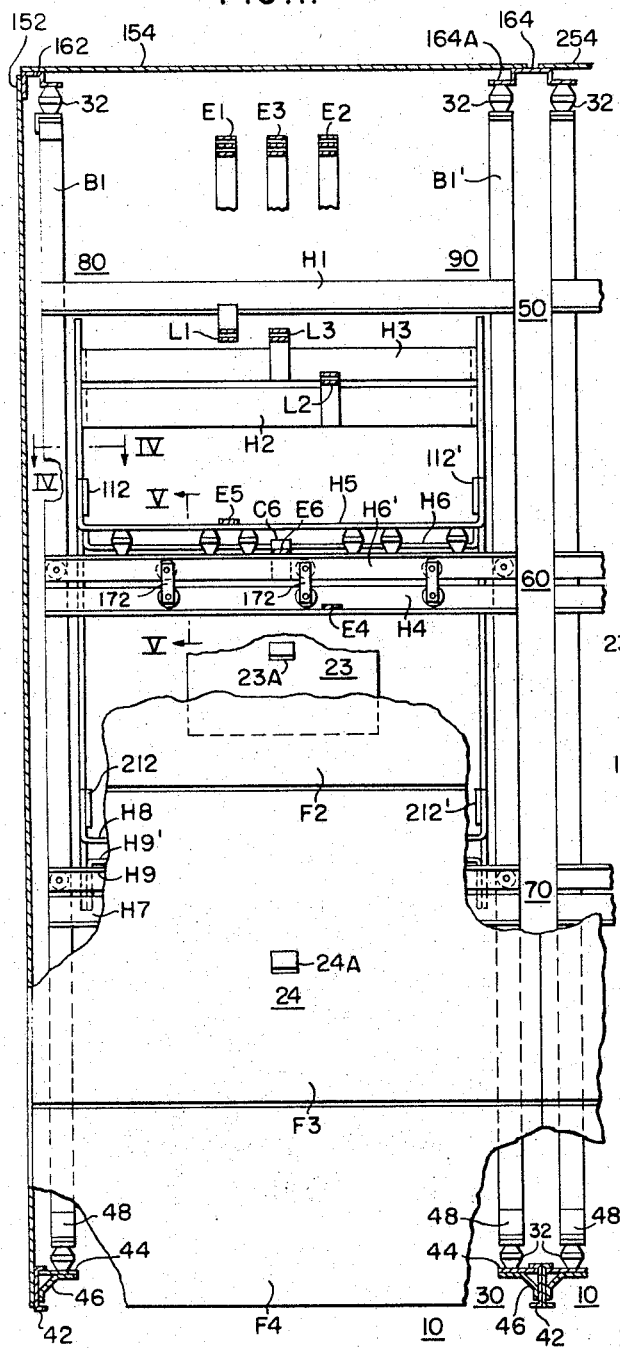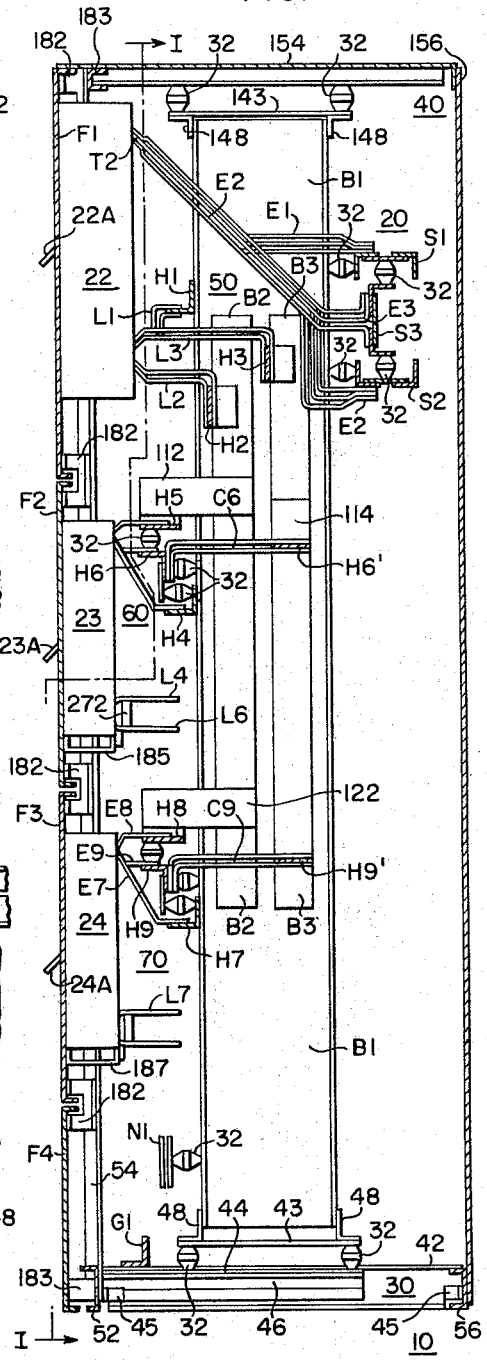

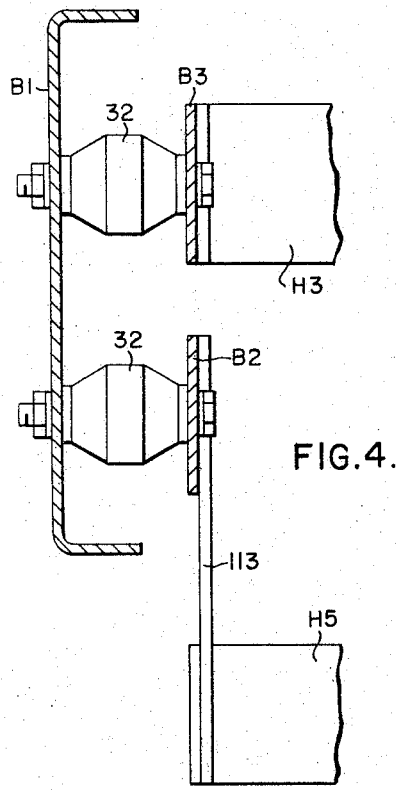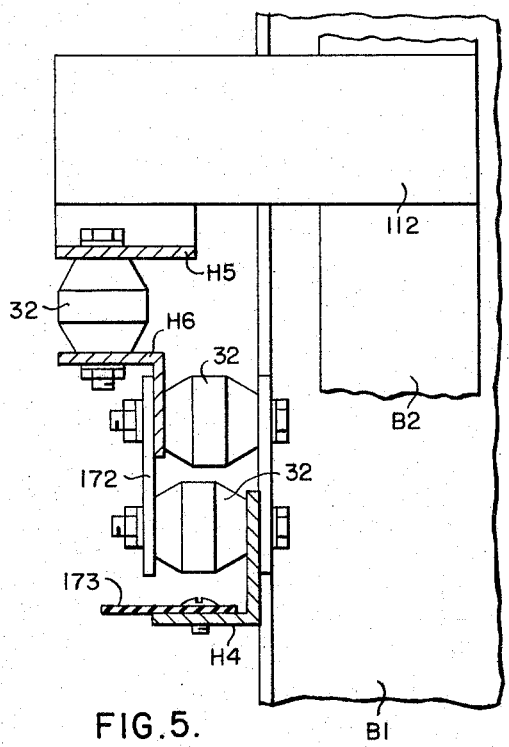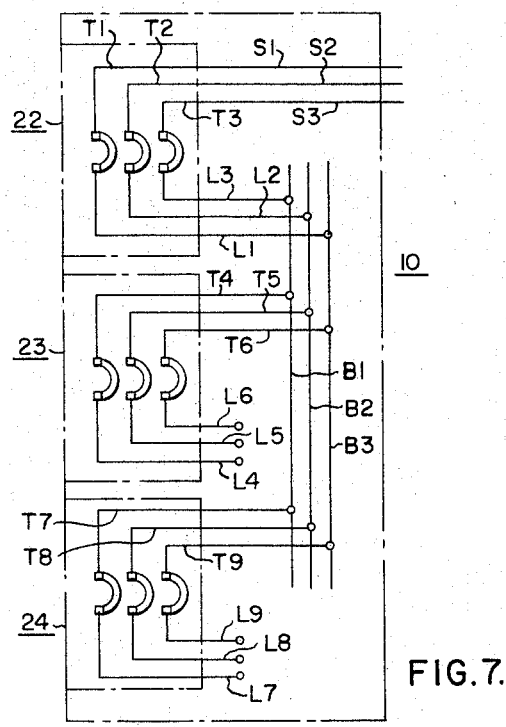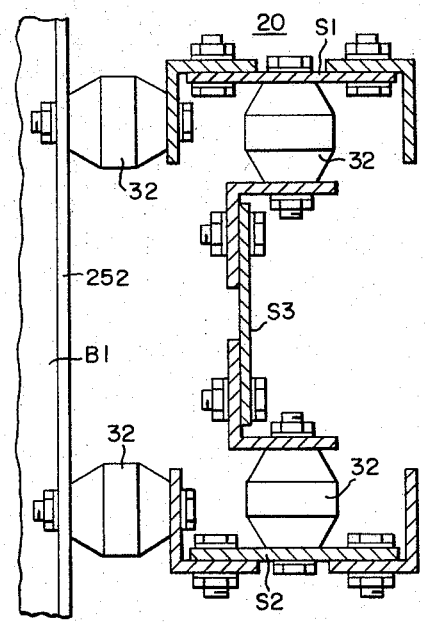

3,333,159
SWITCHBOARD STRUCTURE
Arthur B. Niemoller, Montgomery, Cincinnati, Ohio, assignor to Westinghouse Electric Corporation, Pittsburgh, Pa., a corporation of Pennsylvania
Filed Feb. 28, 1966, Ser. No. 530,472
8 Claims. (Cl. 317—120)

This invention relates to switchboards and more particularly to enclosed switchboards for housing control apparatus for controlling the distribution of electric power to various power utilizing devices or circuits.

In a conventional switchboard structure, a separate framework is provided on which the electrical bus bars which form part of the switchboard are supported and on which the associated electrical control apparatus, such as circuit breakers or motor starters, are also supported. In such a switchboard construction, the control apparatus units which form part of the switchboards are supported by the associated framework substantially independently of the associated electrical bus bars included in the switchboard. It is therefore desirable to provide an improved switchboard construction in which greater advantage is taken of the structural strength of the electrical bus bars which form part of the switchboard to at least assist in supporting the associated control apparatus units which form part of the switchboard.

It is an object of this invention to provide a new and improved switchboard construction of the enclosed type.

A more specific object of this invention is to provide an improved switchboard construction including electrical bus bars which also function as supporting means for the associated control apparatus units.

Another object of this invention is to provide an improved means for supporting control apparatus units in a switchboard structure.

A further object of this invention is to provide a more compact switchboard construction.

Other objects of the invention will, in part, be obvious and will, in part, appear hereinafter.

For a fuller understanding of the nature and objects of the invention, reference should be had to the following detailed description taken in conjunction with the accompanying drawings, in which:

FIGURE 1 is a view in front elevation, of a switchboard housing structure embodying the principal features of the invention with parts of the structure being broken away for greater clarity;

FIG. 2 is a view, partly in side elevation and partly in section, of the structure shown in FIG. 1;

FIG. 4 is an enlarged detailed view, partly in plan and partly in section, of a portion of the structure shown in FIG. 1, taken along the line IV—IV in FIG. 1;

FIG. 5 is an enlarged detailed view, partly in side elevation and partly in section, of a portion of the structure shown in FIG. 1, taken along the line V—V in FIG. 1;

FIG. 6 is an enlarged detailed view, partly in side elevation and partly in section, of a portion of the structure shown in FIG. 1; and FIG. 7 is a diagrammatic view which is useful in describing the electrical connections of the control apparatus units included in the switchboard structure of FIG. 1.

Figure 3:
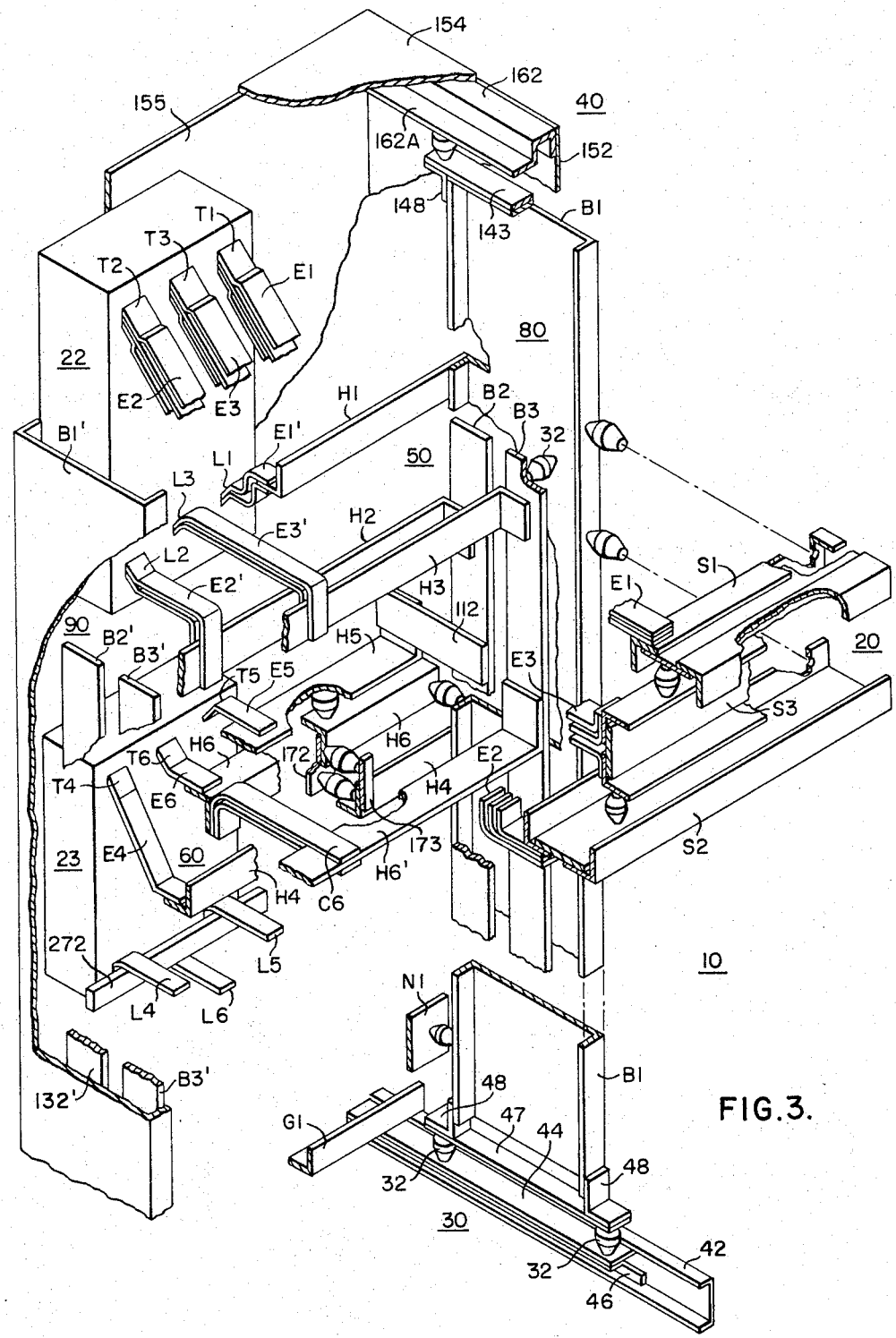
FIG. 3 is an enlarged view, in perspective, of a portion of the switchboard housing structure shown in FIG. 1.

Referring now to the drawings and FIGS. 1 and 2 in particular, the switchboard structure shown therein comprises a plurality of housing sections 10 which are disposed in side-by-side relation. The housing sections 10 are preferably of uniform height, depth and width and may be used either singly or in a group as shown. In order to simplify the drawings only one full housing section and a portion of a second housing section have been shown. It will be understood, however, that as many housing sections as desired may be provided in a particular switchboard structure.

As illustrated, three control apparatus units 22, 23 and 24 are removably mounted in the first housing section 10. As shown in FIG. 2, the particular apparatus units illustrated in the drawings are circuit breakers of the molded case type but it is to be understood that other types of control apparatus units, such as circuit breakers of different types or motor starters, may be provided in a particular application and that such apparatus units may be disposed in side-by-side relation in a particular housing section in addition to being stacked vertically, as illustrated in FIGS. 1 and 2.

In general, the switchboard housing section 10 comprises a base or bottom frame assembly 30, a top frame assembly 40, the vertical bus bar assemblies 80 and 90 which are disposed at the opposite sides of and between the top and bottom frame assemblies 40 and 30, respectively, the vertically spaced horizontal bus bar assemblies 50, 60 and 70 which interconnect the vertical bus bar assemblies 80 and 90, the horizontal bus bar assembly 20 which is mounted at the rear of the vertical bus bar assemblies 80 and 90, the control apparatus units 22, 23 and 24 and a plurality of sheet metal panels or members which are provided to enclose the switchboard housing section 10.

More specifically, the bottom frame assembly 30 is generally rectangular in configuration and includes a pair of laterally spaced channel members 42 which are disposed at the opposite sides of the bottom frame assembly 30, a front channel member 52 and a rear channel member 56, as best shown in FIGS. 1 and 2. The channel members 42, 52 and 56 are rigidly secured to one another at the meeting corners by suitable means, such as the angle members 45, which are secured to the meeting channel members at each corner of the bottom frame assembly 30 by suitable means, such as welding or bolts. It is to be noted that the lower end of a vertical frame member or angle member 54 may be disposed between each of the side channel members 42 and the associated front channel member 52, as best shown in FIG. 2, with the lower end of each of the vertical frame members 54 being secured to the channel members of the bottom frame assembly 30 by suitable means, such as welding or bolts, for a purpose which will be explained hereinafter. In order to support the vertical bus bar assemblies 80 and 90 at the opposite sides of the bottom frame assembly 30, a supporting plate or member 44 is rigidly secured to each of the side channel members 42, as shown in FIG. 1, by suitable means, such as welding, and the bracing members 46 may be provided underneath the supporting plates 44 with the bracing members 46 being secured to both the supporting plate 44 and the associated side channel members 42 by suitable means, such as welding. In order to electrically insulate each of the vertical bus bar assemblies 80 and 90 from the associated bottom frame assembly 30, a plurality of spaced electrical insulators 32 are disposed between each of the vertical bus bar assemblies 80 and 90 and the associated bottom frame assembly 30, as shown in FIGS. 1 and 2.

The vertical bus bar assemblies 80 and 90 include the main channel-shaped bus bars or conductors B1 and B1', respectively, which are supported on and electrically insulated from the bottom frame assembly 30 by the electrical insulators 32. The channel-shaped bus bars or conductors B1 and B1' are disposed generally parallel to the sides of the bottom frame assembly 30 with the lower end of each of the bus bars B1 and B1' being rigidly secured at the sides thereof to a pair of angle members or support feet 48 by suitable means, such as welding or bolts, as best shown in FIG. 2. A cross member or brace 43 may be disposed between the angle members 48 and the associated electrical insulators 32 with each pair of angle members 48, the brace 43 and the associated electrical insulators 32 being rigidly secured to the supporting plates 44 of the bottom frame assembly 30 by suitable means, such as bolts, which pass through the respective angle members 48, the brace 43 and the insulators 32. Similarly, the upper end of each of the channel-shaped bus bars B1 and B1' is electrically insulated from and rigidly secured to the top frame assembly 40 through a plurality of spaced electrical insulators 32 which are secured to a pair of upper angle members 148 through a cross member or upper brace 143 with the angle members 148 being rigidly secured to the upper end of each of the bus bars B1 and B1' by suitable means, such as welding or bolts. The vertical bus bar assemblies 80 and 90 also include the additional laterally spaced, vertically extending pairs of bus bars B2 and B3 and B2' and B3', respectively, which are supported on the associated channel-shaped bus bars B1 and B1', respectively. The additional bus bars B2 and B3 are generally rectangular in cross section and disposed generally parallel to the sides of the base frame assembly 30, as best seen in FIG. 3. The bus bars B2 and B3 are spaced from and electrically insulated from the associated channel-shaped bus bar B1 by a plurality of spaced electrical insulators 32 which support the bus bars B2 and B3 on the associated channel-shaped bus bar B1. The bus bars B2 and B3 may be secured to the associated insulators 32 and the channel-shaped member or bus bar B1 by suitable means, such as bolts, which pass through the respective parts as shown in FIG. 4. Similarly, the bus bars B2' and B3' are generally rectangular in configuration and supported on the associated channel-shaped bus bar B1' in the same fashion as just described in connection with the vertical bus bar assembly 80. It is to be noted that the sides of the channel-shaped bus bars B1 and B1', as illustrated, project inwardly toward one another, as best seen in FIGS. 3 and 4.

The top or upper frame assembly 40 is substantially supported by the vertical bus bar assemblies 80 and 90 which are secured to the top frame assembly 40 at the opposite sides thereof through a plurality of spaced electrical insulators 32 which are disposed between the top frame assembly 40 and the upper end of each of the vertical bus bar assemblies 80 and 90. In particular, the top frame assembly 40 includes a first side frame member 162 which is generally channel shaped in cross section with a flange portion 162 at one side thereof. The flange portion 162A of the side frame member 162 is rigidly secured to the upper end of the vertical bus bar assembly 80 through the electrical insulators 32 by suitable means, such as bolts. The top frame assembly 40 also includes a second side frame member 164 which is generally channel shaped in configuration with a flange portion at each side thereof, as best shown in FIG. 1. The second side frame member 164 of the top frame assembly 40 is adapted to cooperate with a second housing section 10, as shown in FIG. 1. The flange portion 164A of the second side frame member 164 of the top frame assembly 40 is rigidly secured to the upper end of the vertical bus bar assembly 90 through the electrical insulators 32 by suitable means, such as bolts, which pass through the flange portion 164A of the side frame member 164, one of the insulators 32, the brace 143 and one of the upper angle members 148. The top frame assembly 40 also includes a front frame member 183 which extends between the side frame members 162 and 164 and is secured to the side frame members 162 and 164 by suitable means, such as welding. It is to be noted that the upper end of the vertical frame members 54 which are disposed at the opposite side of the housing section 10 may be rigidly secured to the front frame member 183 of the top frame assembly 40 by suitable means, such as welding or bolts. It is important to note that the bottom frame assembly 30, the vertical bus bar assemblies 80 and 90 and the top frame assembly 40 taken together form a free standing or self-supporting framework for the switchboard housing section 10.

The incoming electric power to the switchboard housing section 10 is supplied through a main horizontal bus bar assembly 20 which in general is structurally supported on and extends between the vertical bus bar assemblies 80 and 90, as best shown in FIGS. 2 and 6. More specifically, the horizontal bus bar assembly 20 comprises, as illustrated, three generally channel-shaped bus bars or conductors S1, S2 and S3 which are disposed in generally parallel spaced relation with respect to one another and generally parallel to the front of the switchboard housing section 10, as best shown in FIGS. 3 and 6. As shown in FIG. 6, the opposite ends of each of the bus bars S1 and S2 are rigidly secured to the rear sides of the vertical bus bars B1 and B1', as indicated at 252 for the vertical bus bars B1 through the electrical insulators 32 by suitable means, such as bolts. The bus bar S3 is supported between the vertically spaced bus bars S1 and S2 through the insulators 32 at the opposite sides of the bus bar S3 which are rigidly secured to the adjacent bus bars by suitable means, such as bolts. As shown in FIG. 6, each of the bus bars S1, S2 and S3 may be assembled from a pair of generally L-shaped conductors and an elongated conductor having a substantially rectangular cross section which are secured together by suitable means, such as bolts. It is to be understood that each of the bus bars S1, S2 and S3 may be formed as a single channel-shaped conductor where desired.

In order to carry or transmit electric power or electric current between the vertical bus bar assemblies 80 and 90 and the control apparatus units 22, 23 and 24, the vertically spaced, horizontal bus bar assemblies or groups 50, 60 and 70 are structurally and electrically connected between corresponding bus bars of the vertical bus bar assemblies 80 and 90. The upper bus bar assembly 50 comprises three vertically spaced generally parallel bus bars H1, H2 and H3 which are also disposed generally parallel to the front of the switchboard housing section 10. The opposite ends of the bus bar H1, which is generally L-shaped in cross-section, are rigidly connected to the front sides of the vertical channel-shaped bus bars B1 and B1' of the vertical bus bar assemblies 80 and 90, respectively, by suitable means, such as welding, brazing or bolts. Similarly, the opposite ends of each of the bus bars H2 and H3, which as illustrated are disposed at substantially a right angle with respect to the main portions of said bus bars, are rigidly secured to the vertical bus bars B2 and B2' and B3 and B3', respectively, of the vertical bus bar assemblies 80 and 90, respectively, by suitable means. As mentioned previously, the horizontal bus bars H1, H2 and H3 electrically connect the corresponding vertical bus bars of the vertical bus bar assemblies 80 and 90 and also function as cross members or braces to structurally reinforce the overall framework assembly which is formed by the bottom frame assembly 30, the top frame assembly 40 and the vertical bus bar assemblies 80 and 90.

The intermediate horizontal bus bar assembly 60 comprises the vertically spaced, generally parallel bus bars H4, H5 and H6 which are disposed in front of the vertical bus bar assemblies 80 and 90 and disposed generally parallel to the front of the switchboard housing section 10, as shown in FIGS. 2 and 5, and an additional bus bar H6' which is spaced rearwardly from the bus bars H4, H5 and H6, as best shown in FIG. 2. The opposite ends of the bus bar H4, which is generally L-shaped in configuration, are electrically connected to and rigidly secured to the front sides of the vertical bus bars B1 and B1' of the vertical bus bar assemblies 80 and 90, respectively, by suitable means, such as welding or brazing. The opposite ends of the bus bar H6, which is also generally L-shaped in cross section, is rigidly connected to the front sides of the bus bars B1 and B1' through the associated electrical insulators 32 by suitable means, such as bolts. The bus bar H6 is additionally supported by the bus bar H4 through a plurality of spaced electrical insulators 32 which are secured both to the bus bars H4 and H6 and to a plurality of front and rear vertical braces or tie plates 172 and 173, as best shown in FIG. 3, by suitable means, such as bolts. The opposite ends of the bus bar H5 which are disposed at substantially a right angle with respect to the main portion of the bus bar H5 are supported by and rigidly secured to the vertical bus bars B2 and B2' through the electrically conducting supporting members 112 and 112' which are rigidly secured to both the bus bar H5 and the vertical bus bars B2 and B2', respectively, by suitable means, such as welding or brazing. The bus bar H5 is additionally supported by the bus bar H6 and in turn by the vertical bus bars B2 and B2' through a plurality of spaced electrical insulators 32 which are secured to both the bus bar H5 and the upper portion of the bus bar H6 by suitable means, such as bolts, as best shown in FIG. 5 and FIG. 3.

In order to electrically and structurally connect the bus bar H6 to the vertical bus bars B3 and B3' of the vertical bus bar assemblies 80 and 90, respectively, the opposite ends of the additional bus bar H6' which are disposed at substantially a right angle with respect to the main portion of the bus bar H6' are rigidly secured to the vertical bus bars B3 and B3' by suitable means, such as welding or brazing. The substantially rigid, generally L-shaped electrical connectors or conductors C6 are provided to structurally and electrically connect the bus bars H6 and H6', as best shown in FIG. 3 with the opposite ends of the electrical connectors C6 being rigidly secured to the bus bars H6 and H6' by suitable means, such as brazing or welding.

The lower bus bar assembly 70 comprises the vertically spaced, generally parallel bus bars H7, H8 and H9 which are disposed in front of the vertical bus bar assemblies 80 and 90 and disposed generally parallel to the front of the switchboard housing section 10 and an additional bus bar H9' which is structurally and electrically connected between the vertical bus bars B3 and B3'. The bus bars H7, H8, H9 and H9' are supported on the vertical bus bar assemblies 80 and 90 in the same manner as previously described in detail in connection with the intermediate bus bar assembly 60. The bus bar H9 is electrically and structurally connected to the vertical bus bars B3 and B3' through the substantially rigid, generally L-shaped electrical connectors C9 and the additional bus bar H9' in the same manner as previously described in connection with the electrical connector C6 and the bus bar H6' of the intermediate bus bar assembly 60.

It is important to note that the horizontal bus bar assemblies 20, 50, 60 and 70 just described serve to both transmit electric current or power between the vertical bus bar assemblies 80 and 90 and the control apparatus units 22, 23 and 24, as will be described hereinafter, and also to structurally reinforce or brace the framework which is formed by the bottom and top frame assemblies 30 and 40, respectively, and the vertical bus bar assemblies 80 and 90 which as mentioned previously forms a substantially free standing or self-supporting framework within the switchboard housing section 10. It is also to be noted that in applications where a neutral bus bar is desired, a neutral bus bar N1 may be disposed at the bottom of the switchboard housing section 10 and supported on the vertical bus bars B1 and B1' of the vertical bus bar assemblies 80 and 90, respectively, through the associated electrical insulators 32, as indicated in FIG. 2. The opposite ends of the neutral bus bar N1 are rigidly secured to and supported on the front sides of the vertical bus bars B1 and B1' through the associated electrical insulators 32 by suitable means, such as bolts. As shown in FIG. 2, a ground bus bar G1 may be provided adjacent to the neutral bus bar N1 and supported on the bottom frame assembly 30. In particular, the ground bus G1 which is generally L-shaped in cross-section as illustrated, is rigidly secured to the side frame members 42 of the bottom frame assembly 30 in front of the vertical bus bar assemblies 80 and 90 by suitable means, such as welding or brazing.

In general, the control apparatus units 22, 23 and 24 are disposed in front of and substantially supported by the associated horizontal bus bar assemblies through substantially rigid electrical connectors. As illustrated, the control apparatus unit 22 is electrically connected as a main circuit breaker between the main power supply bus assembly 20 and the vertical bus bar assemblies 80 and 90 to control the flow of electric power from the main power supply bus assembly 20 to the vertical bus bar assemblies 80 and 90. The control apparatus units 23 and 24 are illustrated as feeder circuit breakers which are electrically connected between the vertical bus bar assemblies 80 and 90 and associated load circuits (not shown) to control the flow of electric power from the vertical bus bar assemblies 80 and 90 and the associated respective load circuits.

As best shown in FIG. 3, the apparatus unit 22 includes a plurality of laterally spaced, upper line terminals T1, T2 and T3 which project from the back or rear of the apparatus unit 22 and a plurality of laterally spaced lower line terminals L1, L2 and L3 which also project from the back or rear of the apparatus unit 22. In order to electrically connect the apparatus unit 22 between the bus bar assembly 20 and the bus bar assembly 50 and to substantially support the apparatus unit 22 on said bus assembly, a plurality of substantially rigid electrical connectors or conductors E1, E2 and E3 electrically and structurally connect the terminals T1, T2 and T3 respectively of the apparatus unit 22 to the bus bars S1, S2 and S3, respectively, of the main power supply bus bar assembly 20 by suitable means, such as brazing or bolts, and a plurality of substantially rigid electrical connectors or conductors E1', E2' and E3' electrically and structurally connect the line terminals L1, L2 and L3, respectively, of the apparatus unit 22 to the horizontal bus bar assembly 50 at the bus bars H1, H2 and H3, respectively, by suitable means, such as brazing or bolts. When the contacts of the apparatus unit 22 are closed, electric power or current is permitted to flow from the main power supply bus assembly 20 to the bus bars H1, H2 and H3 of the bus bar assembly 50 and also to the vertical bus bar assemblies 80 and 90 which are electrically and structurally connected to the bus bar assembly 50. When the contacts of the apparatus unit 22 are open, electric power is interrupted between the main power supply bus bar assembly 20 and the bus bar assembly 50 as well as between the bus bar assembly 50 and the vertical bus bar assemblies 80 and 90.

Similarly, the apparatus unit 23 is substantially supported on the adjacent horizontal bus bar assembly 60 by the substantially rigid electrical connectors or conductors E4, E5 and E6 which, as shown in FIG. 3, electrically and structurally connect the linte terminals T4, T5 and T6 of the unit 23 respectively to the bus bars H4, H5 and H6, respectively, by suitable means, such as brazing or bolts. The load terminals L4, L5 and L6 may be electrically connected to whatever load circuit (not shown) is to be controlled by the apparatus unit 23. The load terminals L5, L5 and L6 may be secured to an insulating cross member 272, as shown in FIGS. 2 and 3, which in turn may be structurally connected to the vertical angle members 54 and the front panel F2 by suitable means, such as bolts. As shown in FIG. 3, the load terminals L4, L5 and L6 may be advantageously alternately disposed on opposite sides of the insulating cross member 272 to increase the electrical insulating clearances between the adjacent load terminals.

The apparatus unit 24 is also substantially supported and electrically connected to the bus bar assembly 70 by a plurality of substantially rigid electrical connectors or conductors E7, E8 and E9 which electrically and structurally connect the line terminals T7, T8 and T9 of the apparatus unit 24 to the bus bars H7, H8 and H9, respectively, as indicated in FIG. 2, in the same manner as previously described in detail in connection with the apparatus unit 23. A separate load circuit may be electrically connected to the load terminals of the apparatus unit 24 at the rear of the apparatus unit 24. It is to be understood that in a particular application, a plurality of apparatus units may be disposed in side-by-side relation with the apparatus units shown in the drawing which would be electrically connected to and substantially supported by the adjacent horizontal bus bar assemblies 50, 60 and 70, respectively.

In order to enclose the switchboard housing section 10 and any additional switchboard housing sections similar to the switchboard housing 10 which may be included in a particular switchboard structure, a plurality of sheet metal covers or panels may be removably or fixedly secured to the bottom or top frame assemblies 30 and 40, respectively, or to the vertical angle members 54 which extend between the bottom and top frame assemblies 30 and 40, respectively, at the opposite side thereof adjacent to the front of the switchboard housing section, as best shown in FIG. 2. In particular, a side panel member 152 may be removably secured to the bottom and top frame assemblies 30 and 40, respectively, as indicated in FIG. 1, by suitable means, such as bolts. Similarly, a rear panel member 156 may be removably secured to the bottom and top frame assemblies 30 and 40, respectively, as indicated at 156 in FIG. 2, by suitable means, such as bolts. A top panel or member 154 may be removably secured to the top frame assembly 40 by suitable means, such as bolts. A plurality of front panel members F1 through F4 which are disposed one on top of the other and secured to the spaced bracket members 183 and 183 which are, in turn, secured to the vertical angle members 54 by suitable means, such as bolts. It is to be noted that each of the front panel members F1 through F4 may be individually removed to gain access to one of the apparatus units 22 through 24. It is also to be noted that each of the front panel members F1 through F3 includes an opening through which the handles 22A through 24A of the associated apparatus units 22 through 24, respectively, may project to permit opening and closing of the respective apparatus units externally of the switchboard housing section 10. It is to be understood that an additional side panel member may be disposed at the right end of the switchboard structure which includes one or more of the switchboard housing sections 10 which would be similar to the side panel member 152 and removably secured to the bottom and top frame assemblies of the overall switchboard structure.

Referring now to FIG. 7, the electrical connections between the various apparatus units 22, 23 and 24 and the associated bus assemblies are indicated diagrammatically. As indicated diagrammatically in FIG. 7, the apparatus unit 22 may be electrically connected as a main circuit breaker to control the flow of electric power or current from the main power supply bus bar assembly 20 which includes bus bars S1, S2 and S3 to the vertical bus bar assemblies 80 and 90 which include the bus bars B1, B2 and B3 and B1', B2' and B3', respectively. The apparatus units 23 and 24 are illustrated as being feeder breakers which independently control the flow of electric power or current from the vertical bus bar assemblies 80 and 90 which include the bus bars B1, B2 and B3 to individual load circuits or power utilizing circuits which would be connected at the load terminals L4, L5 and L6 of the apparatus unit 23 or at the load terminals L7, L8 and L9 of the apparatus unit 24.

It is to be understood that in certain applications the apparatus units in a switchboard construction as disclosed may be additionally supported by structrally connecting or securing the respective apparatus units to separate frame members, such as the vertical angle members 54, shown in the drawing, where desired, although it is contemplated that at least a substantial portion of the support for each apparatus unit will be provided through the framework which includes the various vertical and horizontal bus bar assemblies in a switchboard construction as disclosed. It is also to be understood that the horizontal bus bar assemblies 60 and 70 may conveniently be extended horizontally across a plurality of housing sections 10 in an overall switchboard structure to carry electric current or power along the length of such a switchboard structure. In such an arrangement, the main horizontal bus bar assembly 20, which includes the bus bars S1, S2 and S3, would only have to be provided in one of the housing sections if a main breaker were desired for the overall switchboard structure. Alternatively, the horizontal bus bar assemblies 60 and 70 might be horizontally extended across the switchboard structure and the horizontal bus bar assembly 20 might be omitted entirely with the incoming power cables connected directly to one of the vertical or horizontal bus bar assemblies.

The apparatus embodying the teachings of this invention has several advantages. For example, the various bus bars which are included in the disclosed switchboard to carry electric power or current through the different portions of the switchboard structure also serve an important structural purpose by forming part of a supporting framework which substantially supports the various apparatus units which are included in a particular switchboard structure embodying the teachings of the invention. In other words, in a switchboard structure as disclosed, the bottom and top frame assemblies 30 and 40 together with the vertical and horizontal bus bar assemblies as disclosed forms a free standing or self-supporting framework which substantially eliminates the need for a separate supporting framework as provided in a conventional switchboard structure. It is to be noted that in certain applications, an isolating barrier may be disposed between the main bus bar assembly such as the bus bar assembly 20 shown in the drawing and the front portion of the switchboard structure which includes the vertical bus bar assemblies and the other horizontal bus bar assemblies as disclosed. Another important advantage of the applicant's invention is that the elimination of certain separate structural framework members as disclosed permits a more compact construction of the switchboard and also results in a switchboard having a relatively lower weight.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A switchboard comprising a generally rectangular base frame, a plurality of vertically extending, laterally spaced bus bars disposed at each side of the base frame, insulating means disposed between the bus bars and the base frame for supporting the bus bars on the base frame, a plurality of vertically spaced groups of generally horizontally extending, spaced bus bars connecting corresponding vertically extending bus bars at the opposite sides of the base frame, a plurality of electrical control units positioned one above the other in front of the respective groups of horizontally extending bus bars, and a plurality of substantially rigid electrical connectors extending from the back of each control unit to the adjacent group of horizontally extending bus bars to substantially support each control unit on and to electrically connect each control unit to the adjacent group of horizontally extending bus bars.

2. The combination according to claim 1, wherein three vertically extending bus bars are provided at each side of the base frame with two of the three bus bars at each side being supported on the third bus bar through electrically insulating means.

3. The combination as claimed in claim 1 wherein an additional group of horizontally extending bus bars are mounted on the vertically extending bus bars through a plurality of insulating supports on a side of the vertically extending bus bars opposite from the first mentioned groups of horizontally extending groups of bus bars.

4. A switchboard comprising a generally rectangular base frame, three vertically extending, laterally spaced bus bars disposed at each side of the base frame, a plurality of spaced insulators disposed between one of the bus bars at each side of the base frame for supporting said one of the bus bars on the base frame, a plurality of insulators disposed between said one of said bus bars at each side of the base frame and the associated bus bars at the same side to support the associated bus bars on said one of said bus bars, a plurality of vertically spaced groups of generally horizontally extending, laterally spaced bus bars disposed between and connecting corresponding vertically extending bus bars at the opposite sides of the base frame, a generally rectangular top frame disposed above the vertically extending bus bars, a plurality of insulators disposed between the top frame and the vertically extending bus bars at the opposite sides of the top frame for supporting the top frame on the vertically extending bus bars, a plurality of electrical control units each having terminal conductors projecting from the back and being disposed one on top of the other in front of and adjacent to the respective groups of horizontally extending bus bars, and a plurality of substantially rigid electrical connectors extending between the terminal conductors on each control unit and the adjacent horizontally extending bus bars to substantially support each control unit on the adjacent horizontally extending bus bars.

5. The combination as claimed in claim 4 wherein sheet metal members are secured to the top and base frames to form a housing which encloses the switchboard.

6. A switchboard comprising a generally rectangular bottom frame, a channel-shaped bus bar vertically disposed at each side of the bottom frame generally parallel to the sides of the frame, electrically insulating means disposed between each bus bar and the bottom frame for supporting each bus bar on the bottom frame, at least two additional vertically extending, laterally spaced bus bars mounted on each channel-shaped bus bar generally parallel to the sides of the bottom frame, electrically insulating means disposed between each additional bus bar and the associated channel-shaped bus bar, a plurality of vertically spaced groups of horizontally extending, laterally spaced bus bars each connected to corresponding vertically extending bus bars at the opposite sides of the bottom frame, a plurality of electrical control units disposed in front of and adjacent to the respective groups of horizontally extending bus bars, and a plurality of substantially rigid electrical connections extending between the back of each control unit and the adjacent horizontally extending bus bars to substantially support the control units on the adjacent horizontally extending bus bars.

7. The combination as claimed in claim 6 wherein each group of horizontally extending bus bars includes a first bus bar directly connected to the channel-shaped bus bars at the opposite sides of the bottom frame, a second bus bar supported on the channel-shaped bus bars through a plurality of insulating supports and a third bus bar supported on the second bus bar through a plurality of insulating supports.

8. The combination as claimed in claim 7 wherein the first and second bus bars of each group of horizontally extending bus bars are generally L-shaped in cross-section and the third bus bar is generally rectangular in cross-section.

No references cited.

ROBERT K. SCHAEFER, *Primary Examiner.*

M. GINSBURG, *Assistant Examiner.*